3,129,225
NOVEL 4-OXY-3-MALEIMIDYL BETAINES
Seymour L. Shapiro, Hastings on Hudson, Louis Freedman, Bronxville, and Marvin J. Karten, Yonkers, N.Y., assignors to U.S. Vitamin & Pharmaceutical Corporation, New York, N.Y., a corporation of Delaware
No Drawing. Filed June 7, 1961, Ser. No. 115,313
7 Claims. (Cl. 260—247.2)

This invention is concerned with novel 4-oxy-3-maleimidyl betaines which are obtainable by reaction of an N-substituted-3,4-dihalomaleimide with selected tertiary amines as illustrated by the equation below:

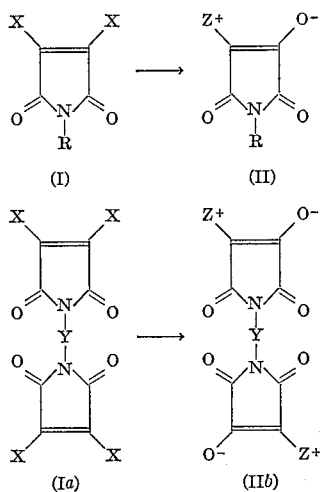

The novel compounds of this invention are effective as antimicrobial and antiparasitic agents and, in addition, have utility as pharmacological agents, particularly in the reduction of serum cholesterol levels. Moreover, they can be employed as reactants for the preparation of other compounds as, for example, by reduction there is obtained in the instance where Z is pyridyl, N-substituted-3-(1-piperidino)-4-hydroxymaleimides.

The reactant dihalomaleimides have X as a halogen with an atomic weight greater than 19, and preferably chloro; R is hydrogen, alkyl, branched and unbranched, having from 1–18 carbon atoms, substituted alkyl, such as alkoxyalkyl, hydroxyalkyl, carboalkoxyalkyl; alkenyl; cycloalkyl, having from 3–12 carbon atoms; aralkyl and substituted aralkyl wherein the substituent may be placed on the alkylene chain as described above, and the aryl ring may be substituted by groups such as halo, trifluoromethyl, lower alkyl, lower alkoxy, lower alkylthio, hydroxy, carboalkoxy, carboxamido, lower alkyl substituted carboxamido, the aryl moiety in turn is derivable from aryl systems such as thiophene, furan, naphthalene; aryl and substituted aryl, which in turn have the generic scope as disclosed for the aryl portion of aralkyl as described above, and sulfolanyl; Y is methylene, polymethylene having from 2–10 carbon atoms and aralkylene, such as o, m, and p-xylylene.

Upon reaction of the N-substituted dichloromaleimides with specific and well-defined classes of tertiary amines (Z), the resultant betaines II (and IIa) with Z carrying a positive charge on its nitrogen are obtained.

Z may be a tertiary amine of aliphatic character such as dimethylalkyl amines and dimethylaralkyl amines such as dimethyl-n-butylamine and dimethylbenzylamine respectively, or, in turn, Z may be N-methyl heterocyclic amine such as N-methylmorpholine, N-methyl-piperidine, N-methyltetrahydroisoquinoline, etc.

For reaction of Z to give II, the tertiary aliphatic amines require two N-methyl groups, however, wherein the valences to the amine nitrogen are tied back as is the case with cyclic amine structures, such as morpholine, steric impediment to reactivity is not sufficiently great, and N-methyl derivatives of such cyclic amines react to give II, with the requirement that the ring atoms flanking the nitrogen are —$CH_2$— groups.

Thus, the tertiary amines, which are operative in affording $Z^+$ substituents in II, are of the structural category $(CH_3)_2NCH_2R_1$, wherein $R_1$ may be alkyl, aralkyl, and cycloalkyl.

In turn, the N-methyl cyclic amines are of the type

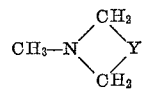

wherein Y is a linking element which is selected from the group consisting of alkylene, alkyleneoxaalkylene, alkylenethiaalkylene, phenylene, tolylene, and xylylene, and wherein the ring bearing the reactive nitrogen contains five to seven atoms.

Steric factors associated with more hindered aliphatic tertiary amines, and particularly those without at least one N-methyl group, as for example, triethylamine, do not permit $Z^+$ type substitution of such tertiary amines on the maleimide nucleus.

Amines, such as triethylamine, sterically disposed so as not to afford the betaine, II, however, can be employed to drive the reaction forward in conjunction with a single equivalent of suitably substituted amine, Z, to give good yields of II (or IIa). Thus, for example, the reaction of one equivalent of 1-(β-phenylethyl)dichloromaleimide with one equivalent of pyridine and two equivalents of triethylamine (or 2,6-lutidine) gave 78.2% (or 68.8%) of 1 - [1-(β-phenylethyl)-4-oxy-3-maleimidyl]pyridinium betaine while the omission of the triethylamine and the 2,6-lutidine and concomitant employment of but a single equivalent of pyridine give only 28.9% yield of II.

The aromatic tertiary amines of the type derived from anilines, as for example, N,N-dimethyl aniline, do not afford compounds of the type II.

Especially reactive in the betaine formation as herein described are the heteroaromatic nitrogen containing cyclic systems typified by compounds such as imidazole, pyridine, pyrazine, pyrimidine, pyridazine, isoquinoline, thiazole, 1,2,4-triazole, isothiazole, oxazole, isoxazole, phthalazine, quinazoline, cinnoline, pteridine, 7,8-benzisoquinoline, furazan, and purine, and suitably substituted derivatives of such ring systems.

Thus, the heteroaromatic amine may be derivatized and yield products of the type II when groups such as alkyl, aralkyl, aryl, hydroxyl, alkoxyl, acyl, formyl, carboxyl, carboalkoxyl, carboxyamido, N,N-dialkylcarboxyamido, hydrazido, amino, acyloxy, halo, —CH=NOH, hydrazino, mercapto, alkylthio, sulfonamido, and substituted sulfonamido, are attached to the hetero ring system.

However, steric factors associated with groups in the proximity of the azine nitrogen restrict the generality of the reaction to the degree that the substituent must not be present on either atom flanking the azine nitrogen. The reaction requires that the azine nitrogen be unhindered.

Thus, 2-picoline or 2,6-dimethylpyridine with bulky methyl groups attached to the carbon atoms, adjacent to the pyridine nitrogen do not afford final products containing the reactant Z group. The 8-carbon atom of quinoline offers sufficient steric resistance in its proximity to the nitrogen to prevent this amine from providing $Z^+$ in II. Alternatively, such sterically hindered amines can function as bases that carry a suitable reactant, Z (using only one equivalent), to the final compound II (or IIa).

Other sterically hindered molecules include 2-phenylpyridine, 2-chloropyridine, 2-carboxypyridine, 2-carbethoxypyridine, 2-formylpyridine. The presence of amino groups on the ring atom adjacent to the azine nitrogen is associated with a different type of reaction, and while reactivity is noted, the resultant products are not betaines of the type II.

In turn, when the heteroaromatic amine has more than one azine nitrogen, one of which is flanked by a substituent which sterically interferes with its reactivity, as for example, 2-methylpyrazine, the other nitrogen remains accessible and the product obtained has the Formula III, and with sulfapyrazine the product has the Formula IV.

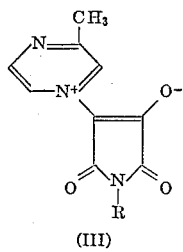

(III)

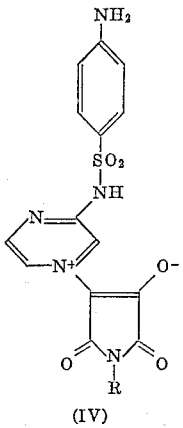

(IV)

In general, heteroaromatics which contain at least one unhindered azine nitrogen in a ring as small as 5 ring atoms and as large as 7 ring atoms, or in fused ring systems containing as many as three rings totalling 14 ring atoms, wherein ring atoms in addition to carbon may include such atoms as oxygen, sulfur, or nitrogen, will yield the products of this invention. The ring systems may be substituted as described above, with the reservation that no substituent be attached to the ring atoms adjacent to the reactant azine nitrogen. The structural specificity of this reaction is so definite that trace quantities of pyridine in substantially pure α-picoline (which is unreactive) afford the pyridine derivatives, and trace quantities of isoquinoline in quinoline (which is unreactive) give the isoquinoline derivatives as the only isolated betaine.

The compounds are usually obtained as crystals ranging in color from pale yellow to orange-red. They are soluble in hydrochloric acid and reprecipitated with water (unless R or Z contains additional amino groups).

The N-substituted dihalomaleimides of the type I and Ia may be prepared by the following procedures:

(1) A dihalomaleic anhydride is treated in methanol with a primary amine ($RNH_2$) at 105° C.

(2) A dihalomaleic anhydride is treated with a primary amine ($RNH_2$) in glacial acetic acid at 100–120° C.

(3) A dihalomaleic anhydride is treated with a primary amine ($RNH_2$) in glacial acetic acid at 25–120° C.

(4) The unsubstituted (re nitrogen atom) dihalomaleimide is treated with an alkyl halide (RBr) or primary amine ($RNH_2$), or the alcohol (ROH).

The preferred procedure is method 2, which provides the best yields, and most rapid conversion.

While the reactant I is as readily prepared from dibromomaleic anhydride, or diiodomaleic anhydride, and since each of such derivatives provide the same halogen free betaine, II, we have preferred, in the interests of economy, to prepare the reactants, I, from dichloromaleic anhydride.

Compounds typifying the initial reactants are shown in Table I.

TABLE I.—N-SUBSTITUTED-3,4-DICHLORO-MALEIMIDES

| R | M.P., °C.[a] | Yield, percent |
|---|---|---|
| H— | 180 | 7.8 |
| $CH_2$=$CHCH_2$— | 62 | 68.0 |
| n-$C_4H_9$— | 38 | 67.8 |
| i-$C_5H_{11}$— | 57–58 | 79.8 |
| n-$C_{12}H_{25}$— | 61 | 94.8 |
| (b) | 46 | 68.0 |
| $C_2H_5OCOCH_2$— | [a1] 73–74 | 36.5 |
| $HOCH_2CH_2$— | 58–59 | 37.1 |
| $C_6H_{11}$—[c] | 143–144 | 37.0 |
| $C_6H_5CH_2$— | 112–113 | 55.5 |
| $(C_6H_5)_2CH$— | 115–116 | 53.9 |
| $C_6H_5CH_2CH_2$— | 134 | 74.1 |
| $C_6H_5CH_2CHCH_3$— | 84 | 44.4 |
| (d) | 66 | 92.8 |
| $C_6H_5$— | 208–210 | 48.0 |
| 2-$ClC_6H_4$— | 132 | 100 |
| 3-$ClC_6H_4$— | 183 | 100 |
| 4-$ClC_6H_4$— | 210–216 | 94.9 |
| 4-$IC_6H_4$— | 251–254 | 97.8 |
| 4-$CH_3OC_6H_4$— | 209–210 | 92.0 |
| 2-$CF_3C_6H_4$— | 152 | 73.6 |
| (e) | 204 | 97.7 |
| (f) | [a2] 250 | 71.8 |

| R REPLACED BY Y FOR BIS COMPOUNDS OF TYPE Ia | | |
|---|---|---|
| —$CH_2CH_2$— | [a2] 296–299 | 47.5 |
| —$(CH_2)_6$— | 193 | 50.0 |
| (g) | 127–129 | 58.7 |

[a] Compounds were recrystallized from ethanol unless otherwise shown. [a1] Hexane. [a2] Methyl cellosolve. Acceptable analyses have been obtained for the compounds shown in this table. [b] Lauroxypropyl. [c] Cyclohexyl. [d] 2-furfuryl. [e] 1-naphthyl. [f] 3-sulfolanyl. [g] Xylylene-1,3-.

Typifying synthesis of the compounds described above are the following:

*1-carbethoxymethyldichloromaleimide.*—A mixture of 9.0 g. (0.054 mole) of dichloromaleic anhydride in 15 ml. of glacial acetic acid and 5.2 g. (0.05 mole) of glycine ethyl ester was maintained at 100° for one hour. When cool, on addition of 15 ml. water, the product precipitated and was separated to give 4.6 g. (36.5%).

*1-benzyldichloromaleimide.*—A mixture of 9.0 g. (0.054 mole) of dichloromaleic anhydride in 14 ml. of glacial acetic acid and 5.3 g. (0.05 mole) of benzylamine was maintained at 115° C. for one hour. The solid which precipitated was filtered, washed with diethyl ether and dried to give 7.1 g. (55.5%) of product.

Alternatively, 8.35 g. (0.05 mole) of dichloromaleic anhydride was mixed with 15 ml. methanol, refluxed for 0.5 hour and then treated with 5.3 g. (0.05 mole) of benzylamine at 105° C. for 0.75 hour. The reaction mixture was cooled, the solid filtered, washed with ethanol and dried to give 1.3 g. (10.2%) of product.

*1 - (2 - trifluoromethylphenyl)dichloromaleimide.*—A mixture of 9.0 g. (0.054 mole) of dichloromaleic anhydride in 15 ml. of glacial acetic acid and 8.05 g. (0.05 mole) of 2-trifluoromethylaniline was maintained at 100° C. for one hour. When cool, the formed product was separated to give 11.4 g. (73.6%).

*Bis-(1-dichloromaleimido)-1,3-xylene.*—A mixture of 9.0 g. (0.054 mole) of dichloromaleic anhydride in 14 ml. of glacial acetic acid and 3.4 g. (0.025 mole) of 1,3-xylylenediamine was maintained at 110–115° C. for one hour. When cool, the formed product was separated to give 6.4 g. (58.7%). It has the following formula:

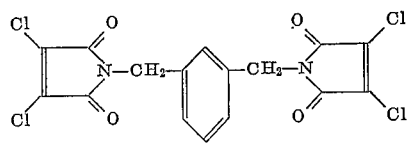

To prepare the (1-substituted-4-oxy-3-maleimidyl)Z-substituted betaines of type II (and IIa), the following methods may be employed:

(1) A compound of the type I (or Ia) is treated with an excess of a tertiary amine in glacial acetic acid at 90–120° C.

(2) A compound of the type I (or Ia) is treated with an equivalent amount of a tertiary amine in glacial acetic acid at 90–120° C. in the presence of an excess of another tertiary amine too sterically hindered to effect Z-type substitution and sufficiently basic to serve as a hydrohalide acceptor.

(3) A compound of the type I (or Ia) is treated with an excess of a tertiary amine in refluxing methanol.

(4) A compound of the type I (or Ia) is treated with an equivalent amount of a tertiary amine in refluxing methanol in the presence of an excess quantity of another tertiary amine as characterized under (2).

(5) A dihalomaleic anhydride is reacted with methanol and a primary amine, followed by treatment with a tertiary amine at 90–110° C.

(6) A dihalomaleic anhydride is reacted with a primary amine in glacial acetic acid at 25–100° C., followed by treatment with a tertiary amine at 90–120° C.

(7) A compound of the type II (where R=H) is treated with an alkyl halide, alcohol, or a primary amine to give a compound of the type where R is substituted.

The preferred procedures are methods 1–3, and applications of the methods are shown in Table II and in the examples which follow below.

The course of the reaction involves certain color changes which may be detailed as follows: Addition of the tertiary amine to compounds of the type I (or Ia) in methanol or glacial acetic acid caused the solution to turn yellow. During the heating period, depending upon the type of dihalomaleimide (I) and tertiary amine employed, the solution undergoes a series of color transitions ranging from yellow to orange-brown or yellow to deep red which could also be accompanied by the precipitation of a solid ranging in color from yellow to orange-red.

Compounds typifying the products of this invention are characterized in Table II.

TABLE II.—MALEIMIDYLBETAINES

| R | Z[a] | M.P., °C. | R.S.[b] | Method | Yield |
|---|---|---|---|---|---|
| 4-ClC$_6$H$_4$— | 1 | 205–207 | A | 3 | 71.3 |
| 4-IC$_6$H$_4$— | 2 | 180 | B | 3 | 29.7 |
| n-C$_{12}$H$_{25}$— | 3 | 245 | B | 1 | 46.4 |
| C$_6$H$_5$CH$_2$— | 3 | 268–270 | A | 1 | 32.0 |
| 3-ClC$_6$H$_4$— | 3 | >300 | A | 2 | 36.6 |
| H— | 4 | >300 | C | 5 | 2.1 |
| (c) | 4 | 101 | A | 1 | 79.2 |
| C$_6$H$_5$CH$_2$— | 4 | 208–209 | C | 5 | 35.6 |
| C$_6$H$_5$CH$_2$CH$_2$— | 4 | 170–171 | A | 5 | 42.8 |
| 2-ClC$_6$H$_4$— | 5 | 293–294 | B | 2 | 88.0 |
| 4-IC$_6$H$_4$— | 5 | >300 | B | 2 | 87.4 |
| HOCH$_2$CH$_2$— | 6 | 152 | A | 1 | 68.8 |
| (c) | 6 | 116–118 | A | 1 | 74.8 |
| (d) | 6 | 192–193 | A | 1 | 72.7 |
| n-C$_{12}$H$_{25}$— | 7 | 165 | A | 1 | 50.7 |
| C$_6$H$_{11}$—e | 7 | 275–276 | B | 1 | 80.0 |
| 4-CH$_3$OC$_6$H$_4$— | 7 | 227 | B | 1 | 94.4 |
| C$_6$H$_5$CH$_2$CH$_2$— | 8 | 296–298 | B | 3 | 85.0 |
| (f) | 8 | >300 | B | 1 | 79.0 |
| (d) | 8 | >300 | D | 1 | 87.8 |
| 4-IC$_6$H$_4$— | 9 | 255–258 | B | 2 | 83.0 |
| 4-CH$_3$OC$_6$H$_4$— | 9 | 224 | B | 1 | 64.5 |
| C$_6$H$_5$CH$_2$CH$_2$— | 10 | 103–104 | A | 2 | 43.5 |
| C$_6$H$_5$CH$_2$CH$_2$— | 11 | 232–233 | A | 1 | 62.2 |
| C$_6$H$_5$CH$_2$CH$_2$— | 12 | 268 | B | 1 | 71.3 |
| 4-ClC$_6$H$_4$— | 13 | 213–214 | B | 2 | 58.7 |
| (f) | 13 | 193 | A | 1 | 75.5 |
| i-C$_3$H$_{11}$— | 14 | 237–238 | A | 1 | 60.4 |
| n-C$_4$H$_9$— | 15 | 274–275 | B | 3 | 76.9 |
| | 15 | 253–255 | B | 1 | 70.6 |
| (c) | 15 | 284–285 | B | 3 | 85.5 |
| C$_6$H$_5$CH$_2$— | 15 | >300 | D | 2 | 90.3 |
| 2-F$_3$CC$_6$H$_4$— | 16 | 177–178 | A | 1 | 56.7 |
| C$_3$H$_5$—g | 16 | 139 | A | 2 | 57.7 |
| C$_2$H$_5$OCOCH$_2$— | 16 | 235–236 | A | 3 | 74.1 |
| (C$_6$H$_5$)$_2$CH— | 16 | 189–190 | A | 2 | 69.4 |
| 2-F$_3$CC$_6$H$_4$— | 16 | 210 | B | 1 | 71.8 |
| 4-CH$_3$OC$_6$H$_4$— | 17 | 185–195 | B | 1 | 16.8 |
| C$_6$H$_5$CH$_2$CH$_2$— | 18 | 263 | B | 2 | 51.1 |
| n-C$_{12}$H$_{25}$— | 19 | 162–165 | A | 1 | 77.5 |
| C$_6$H$_5$CH$_2$— | 19 | 223–229 | B | 1 | 95.8 |
| C$_6$H$_5$CH$_2$CHCH$_3$— | 19 | 200 | A | 1 | 44.9 |
| i-C$_5$H$_{11}$— | 20 | 265 | A | 1 | 32.0 |
| C$_6$H$_5$CH$_2$— | 21 | >300 | B | 2 | 27.8 |
| C$_6$H$_5$CH$_2$CH$_2$— | 22 | 195–196 | A | 2 | 48.5 |
| C$_6$H$_5$CH$_2$CH$_2$— | 23 | 189–190 | A | 2 | 73.9 |
| C$_3$H$_5$—g | 24 | 185 | A | 1 | 64.6 |
| (C$_6$H$_5$)$_2$CH— | 24 | >300 | A | 1 | 94.4 |
| n-C$_{12}$H$_{25}$— | 25 | 173 | A | 3 | 46.1 |
| C$_6$H$_5$CH$_2$— | 25 | 169–170 | A | 3 | 32.8 |
| 3-ClC$_6$H$_4$— | 25 | 210–211 | A | 3 | 34.2 |

R REPLACED BY Y FOR BIS COMPOUNDS OF TYPE IIa

| Y | Z | M.P. | R.S. | Method | Yield |
|---|---|---|---|---|---|
| —CH$_2$CH$_2$— | 7 | 260 | B | 2 | 76.7 |
| —(CH$_2$)$_6$— | 4 | >300 | B | 2 | 74.5 |
| (h) | 6 | >300 | B | 2 | 94.5 |

[a] The following tertiary amines emerge as Z[+] [at the 3° nitrogen (unhindered N if more than one N)] in the final product:

1. N,N-dimethyl-n-butylamine
2. N,N-dimethylbenzylamine
3. Imidazole
4. Pyridine
5. 4-picoline
6. 4-n-amylpyridine
7. 4-benzylpyridine
8. 3-hydroxypyridine
9. 3-acetylpyridine
10. 3-pyridine aldehyde
11. 4-pyridine aldehyde
12. Isonicotinic acid
13. Ethyl nicotinate
14. Methyl isonicotinate
15. Nicotinamide
16. N,N-diethyl-nicotinamide
17. Isonicotinic acid hydrazide
18. 4-pyridine aldoxime
19. 3-aminopyridine
20. 4-aminopyridine
21. Pyrazine
22. 2-methyl pyrazine
23. Pyridazine
24. Isoquinoline
25. N-methylmorpholine

[b] R.S.=recrystallizing solvent; A=ethanol; B=methyl cellosolve; C=water; D=dimethylformamide; E=hexane. [c] Lauroxypropyl. [d] 3-sulfolanyl. [e] Cyclohexyl. [f] Furfuryl. [g] Allyl. [h] Xylylene-1,3.

These representatives examples shown above illustrate the generality of the reaction within the structure limits defined above.

As an illustrative embodiment of the manner in which the invention may be practiced, the following examples are presented, which, however, are not to be construed as limiting.

*Example 1*

N-[1-(4-CHLOROPHENYL)-4-OXY-3-MALEIMIDYL]-N,N-DIMETHYLBUTYLAMMONIUM BETAINE

A suspension of 2.77 g. (0.01 mole) of 1-(4-chlorophenyl)-dichloromaleimide in 20 ml. of methanol was treated with 5.1 g. (0.05 mole) of N,N-dimethylbutylamine, refluxed for 18 hours and poured into 20 ml. of water. The yellow solid which precipitated was filtered, washed with water and diethyl ether and dried to give 2.3 g. (71.3%) of product.

*Example 2*

3-(1-LAURYL-4-OXY-3-MALEIMIDYL) IMIDAZOLIUM BETAINE

A solution of 3.0 g. (0.009 mole) of 1-lauryldichloromaleimide in 35 ml. of glacial acetic acid was treated with a solution of 3.4 g. (0.05 mole) of imidazole in 14 ml. of glacial acetic acid at 100–110° C. for one hour and poured into 40 ml. of water. The orange solid which precipitated was filtered, washed with ethanol and ether and dried to give 1.45 g. (46.4%) of product.

*Example 3*

1-[1-(2-PHENYLETHYL-4-OXY-3-MALEIMIDYL]PYRIDINIUM BETAINE

A. Using about three equivalents of pyridine a solution of 1.32 g. (0.0049 mole) of 1-(2-phenylethyl)-dichloromaleimide in 15 ml. of glacial acetic acid was treated with a solution of 1.19 g. (0.015 mole) of pyridine in 3 ml. of glacial acetic acid at 100° C. for one hour and poured into 15 ml. of water. The yellow solid which precipitated was filtered, washed with ethanol and ether and dried to give 1.15 g. (78.3%) of product.

B. Using equivalent amounts of pyridine and 1-(2-phenylethyl)-dichloromaleimide a solution of 2.7 g. (0.01 mole of 1-(2-phenylethyl)dichloromaleimide in 25 ml. of glacial acetic acid was treated with a solution of 0.79 g. (0.01 mole) of pyridine in 5 ml. glacial acetic acid at 100° C. for one hour and poured into 25 ml. of water. The yellow solid which precipitated was filtered, washed with ethanol and ether and dried to give 0.84 g. (28.6%) of product.

C. Employing one equivalent of pyridine, one equivalent of 1-(2-phenylethyl)dichloromaleimide and two equivalents of triethylamine a solution of 2.7 g. (0.01 mole) of 1-(2-phenylethyl)dichloromaleimide in 25 ml. of glacial acetic acid was treated with a solution of 0.79 g. (0.01 mole) of pyridine and 2.1 g. (0.02 mole) of triethylamine in 5 ml. of glacial acetic acid at 105° C. for one hour and poured into 30 ml. of water. The yellow solid which precipitated was filtered, washed with ethanol and ether and dried to give 2.3 g. (78.2%) of product. In addition, the filtrate yielded 1.89 g. (88.3%) of triethylamine hydrochloride.

This latter example indicates that while the reaction to afford the final product betaine requires three equivalents of a base, one of which enters as a substituent in the final product, and two to serve as binders of the two moles of the resultant hydrogen chloride reflecting the elimination of the two chlorine atoms, that suitable bases (preferably those which are economically available) can assume the role of the acid-acceptor, with the single equivalent of the desired reactant base adding to the final product.

*Example 4*

1-(1-BENZYL-4-OXY-3-MALEIMIDYL)PYRIDINIUM BETAINE 8.35 g. (0.05 mole) of dichloromaleic anhydride was refluxed with 15 ml. of methanol for 0.5 hour, the solution was cooled, and 9.8 g. (0.12 mole) of pyridine and 5.3 g. (0.05 mole) of benzylamine was added. The reaction mixture was heated at 90–100° C. for 0.5 hour, cooled, solidified and filtered. The greenish-yellow solid obtained from both the filter-cake and the filtrate were combined, washed with acetone and dried to give 5.0 g. (35.6%) of product.

*Example 5*

1-(1-CYCLOHEXYL-4-OXY-3-MALEIMIDYL)-4-BENZYLPYRIDINIUM BETAINE

A solution of 2.35 g. (0.0095 mole) of 1-cyclohexyldichloromaleimide in 35 ml. of glacial acetic acid was treated with a solution of 8.45 g. (0.05 mole) of 4-benzylpyridine in 9 ml. of glacial acetic acid at 95–105° C. for one hour and poured into 45 ml. of water. The yellow solid which precipitated was filtered, washed with ethanol and ether and dried to give 2.75 g. (80.0%) of product.

*Example 6*

1-[1-3-SULFOLANYL)-4-OXY-3-MALEIMIDYL]-3-HYDROXYPYRIDINIUM BETAINE

A solution of 3.0 g. (0.01 mole) of 1-(3-sulfolanyl)dichloromaleimide in 40 ml. of glacial acetic acid was treated with a solution of 5.7 g. (0.06 mole) of 3-hydroxypyridine in 6 ml. of glacial acetic acid at 100–110° C. for one hour and a yellow solid formed. The solid was filtered, washed with ether and acetone and dried to give 3.0 g. (87.8%) of product.

*Example 7*

1-[1-(4-METHOXYPHENYL)-4-OXY-3-MALEIMIDYL]-3-ACETYLPYRIDINIUM BETAINE

A solution of 3.0 g. (0.011 mole) of 1-(4-methoxyphenyl)-dichloromaleimide in 35 ml. of glacial acetic acid was treated with a solution of 6.05 g. (0.05 mole) of 3-acetylpyridine in 6 ml. of glacial acetic acid at 100–110° C. for one hour and poured into water. The orange solid which precipitated was filtered, washed with acetone and dried to give 2.4 g. (64.5%) of product.

*Example 8*

1-[1-(2-PHENYLETHYL)-4-OXY-3-MALEIMIDYL]-4-FORMYLPYRIDINIUM BETAINE

A solution of 3.0 g. (0.011 mole) of 1-(2-phenylethyl)dichloromaleimide in 30 ml. of glacial acetic acid was treated with a solution of 7.5 g. (0.07 mole) of 4-pyridine carboxaldehyde in 8 ml. of glacial acetic acid at 100–110° C. for one hour (under nitrogen) and poured into water. The orange solid which precipitated was washed with ether and dried to give 1.4 g. (43.5%) of product isolated as the hemiacetal.

*Example 9*

1-[1-(2-PHENYLETHYL)-4-OXY-3-MALEIMIDYL]-4-CARBOXYPYRIDINIUM BETAINE

A solution of 3.0 g. (0.011 mole) of 1-(2-phenylethyl)dichloromaleimide in 60 ml. of glacial acetic acid was treated with 8.6 g. (0.07 mole) of isonicotinic acid at 100–115° C. for 15 hours. The yellow solid, which precipitated upon cooling, was filtered, washed with boiling water, ethanol and ether and dried to give 2.65 g. (71.3%) of product.

*Example 10*

1-(1-LAUROXYPROPYL-4-OXY-3-MALEIMIDYL)-3-CARBOXAMIDOPYRIDINIUM BETAINE

A solution of 3.0 g. (0.0077 mole) of 1-lauroxypropyldichloromaleimide in 30 ml. of glacial acetic acid was treated with a solution of 4.9 g. (0.04 mole) of nicotinamide in 5 ml. of glacial acetic acid at 100–110° C. for one hour. The yellow solid which precipitated upon cooling was filtered, washed with ethanol and ether and dried to give 2.5 g. (70.6%) of product.

*Example 11*

1-[1-(2-PHENYLETHYL)-4-OXY-3-MALEIMIDYL]-4-HYDRAZIDOPYRIDINIUM BETAINE

A solution of 3.0 g. (0.011 mole) of 1-(2-phenylethyl)dichloromaleimide in 30 ml. of glacial acetic acid was treated with a solution of 6.85 g. (0.05 mole) of isonicotinic acid hydrazide in 20 ml. of glacial acetic acid at 100° C. for one hour and poured into 30 ml. of water. The green-red (dichrotic) solid which precipitated was washed with ethanol and ether and dried to give 0.65 g. (16.5%) of product.

Example 12

1-[1-METHYL-2-PHENYLETHYL)-4-OXY-3-MALE-IMIDYL]-3-AMINOPYRIDINIUM BETAINE

A solution of 2.84 g. (0.01 mole) of 1-(1-methyl-2-phenylethyl)dichloromaleimide in 35 ml. of glacial acetic acid was treated with a solution of 4.7 g. (0.05 mole) of 3-aminopyridine in 10 ml. of glacial acetic acid at 100–110° C. for one hour. The yellow solid which precipitated upon cooling was filtered, washed with ether and dried to give 1.45 g. (44.9%) of product.

Example 13

1-[1-(2-PHENYLETHYL)-4-OXY-3-MALEIMIDYL] PYRAZINIUM BETAINE

A solution of 2.7 g. (0.01 mole) of 1-(2-phenylethyl)dichloromaleimide in 25 ml. of glacial acetic acid was treated with a solution of 0.80 g. (0.01 mole) of pyrazine and 3.05 g. (0.03 mole) of triethylamine in 7 ml. of glacial acetic acid at 100–110° C. for 17 hours. The light green solid which formed was filtered, washed with ether, and dried to give 0.82 g. (27.8%) of product.

Example 14

1-[1-(2-PHENYLETHYL)-4-OXY-3-MALEIMIDYL]-3-METHYLPYRAZINIUM BETAINE

A solution of 2.7 g. (0.01 mole) of 1-(2-phenylethyl)dichloromaleimide in 25 ml. of glacial acetic acid was treated with a solution of 0.94 g. (0.01 mole) of 2-methylpyrazine and 3.05 g. (0.03 mole) of triethylamine in 8 ml. of glacial acetic acid at 105° C. for 16 hours and poured into water. The solid which precipitated was filtered, washed with ether and dried to give 1.5 g. (48.5%) of product.

Example 15

1-[1-(2-PHENYLETHYL)-4-OXY-3-MALEIMIDYL] PYRIDIZINIUM BETAINE

A solution of 2.7 g. (0.01 mole) of 1-(2-phenylethyl)dichloromaleimide in 25 ml. of glacial acetic acid was treated with a solution of 0.8 g. (0.01 mole) of pyridazine and 3.05 g. (0.03 mole) of triethylamine in 7 ml. of glacial acetic acid at 100–110° C. for two hours and poured into water. The greenish-yellow solid which precipitated was filtered, washed with ether and dried to give 2.8 g. (73.9%) of product.

Example 16

2-[1-BENZHYDRYL-4-OXY-3-MALEIMIDYL] ISOQUINOLIUM BETAINE

A solution of 2.9 g. (0.0088 mole) of 1-benzhydryldichloromaleimide in 30 ml. of glacial acetic acid was treated with a solution of 5.8 g. (0.045 mole) of isoquinoline in 7 ml. of glacial acetic acid at 100–110° C. for one hour. The yellow solid which precipitated was filtered, washed with acetone and ether and dried to give 3.3 g. (94.4%) of product.

Example 17

4-[1-(3-CHLOROPHENYL)-4-OXY-3-MALEIMIDYL]-4-METHYL MORPHOLINIUM BETAINE

A solution of 2.76 g. (0.01 mole) of 1-(3-chlorophenyl)dichloromaleimide in 20 ml. of methanol was treated with 6.06 g. (0.06 mole) of N-methylmorpholine at 105° C. for 16 hours, mixed with 10 ml. of water and cooled. The pale yellow solid which precipitated was filtered, washed with ethanol and ether and dried to give 1.1 g. (34.2%) of product.

Example 18

1,1¹-[1,1¹-(1,3-XYLYLENE-BIS)-4-OXY-3-MALEIMIDYL] DI-(4-AMYLPYRIDINIUM)BETAINE

A solution of 3.26 g. (0.0075 mole) of bis-(1-dichloromaleimido)-1,3-xylene in 25 ml. of glacial acetic acid was treated with a solution of 3.35 g. (0.0225 mole) of 4-amylpyridine and 4.54 g. (0.045 mole) of triethylamine in 5 ml. of glacial acetic acid at 100° C. for one hour. The yellow solid which precipitated was filtered, washed with ethanol and dried to give 4.4 g. (94.5%) of product.

The compounds of this invention are desirably formulated as tablets or capsules containing 5–200 mg. of the active ingredient in dosage unit form. These dosage forms are suitably combined with extenders, fillers and lubricants, prepared in the conventional manner. Alternative dosage formulations are sustained release tablets or capsules which are processed in the conventional manner. Additionally, the compounds may be dissolved in suitable organic solvents such as N-methylpyrrolidone, and applied as sprays or nebulizers.

In those instances where the substituent groups on Z or R are of such nature that they bear either basic or acidic groups, salts with non-toxic mineral acids such as hydrochloric salts of amino derivatives or alkali metal salts such as sodium salts or calcium or magnesium salts of carboxyl derivatives, represent convenient forms for solubilizing and administering the compounds of this invention.

In addition, this invention encompasses mixtures of the compounds herein described with each other or with active drugs.

It is to be understood that it is intended to cover all changes and modifications of the examples of this invention herein chosen for the purpose of illustration which do not constitute departures from the spirit and scope of the invention.

We claim:

1. The compound

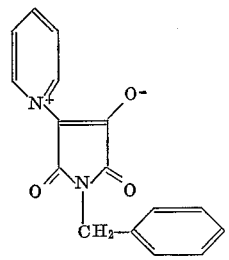

2. The compound

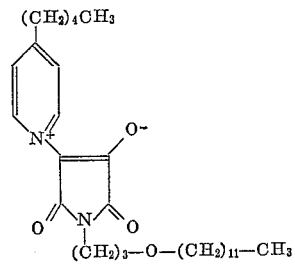

3. The compound

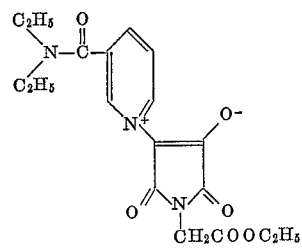

4. The compound

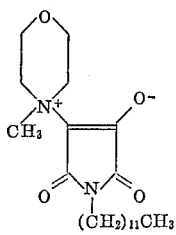

5. The compound

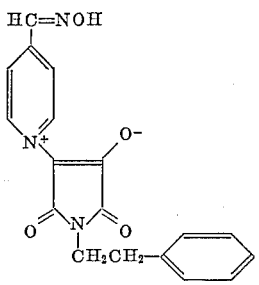

6. The compound

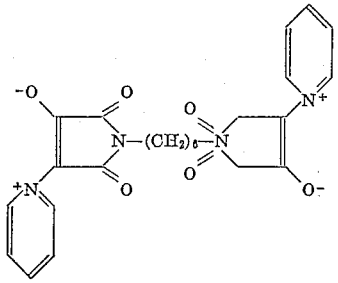

7. A compound selected from the group consisting of compounds of the structural formulae

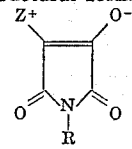

and

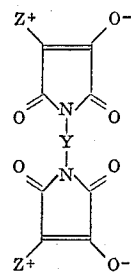

wherein
  (a) R is selected from the group consisting of alkyl of from 1 to 18 carbon atoms, cycloalkyl of from 3 to 12 carbon atoms, carbethoxymethyl, hydroxyethyl, lauroxypropyl, phenyl-lower alkyl, allyl, halophenyl, lower alkoxyphenyl, trifluoromethylphenyl and naphthyl,
  (b) Y is selected from the group consisting of xylylene, methylene and a polymethylene of from 2 to 10 carbon atoms, and
  (c) Z is selected from the group consisting of compounds having the structure $(CH_3)_2NCH_2R_1$, wherein $R_1$ is selected from the group consisting of butyl and phenyl; and cyclic tertiary amines consisting of pyridine, imidazole, isoquinoline, pyrazine, N-methyl morpholine and substituted derivatives thereof wherein substituent is selected from the group consisting of lower alkyl, hydroxy, acetyl, formyl, carboxy, carbomethoxy, carbethoxy, —$CONH_2$, —$CON(C_2H_5)_2$, —$CONHNH_2$, amino, halogen, hydrazino, —CH=NOH, and mercapto.

No references cited.